(12) United States Patent
Kato et al.

(10) Patent No.: US 7,799,720 B2
(45) Date of Patent: Sep. 21, 2010

(54) METHOD OF REGENERATING CARBON DIOXIDE GAS ABSORBENT

(75) Inventors: Masahiro Kato, Naka-gun (JP); Kazuaki Nakagawa, Tokyo (JP); Kenji Essaki, Kawasaki (JP); Sawako Yoshikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1050 days.

(21) Appl. No.: 11/344,013

(22) Filed: Feb. 1, 2006

(65) Prior Publication Data

US 2006/0183628 A1 Aug. 17, 2006

(30) Foreign Application Priority Data

Feb. 2, 2005 (JP) ............................. 2005-026826

(51) Int. Cl.
*B01J 38/02* (2006.01)

(52) U.S. Cl. .......................................... 502/56; 502/20

(58) Field of Classification Search .................. 502/20, 502/56
See application file for complete search history.

(56) References Cited

U.S. PATENT DOCUMENTS

| | | | |
|---|---|---|---|
| 5,840,252 A | 11/1998 | Giertych | |
| 5,866,090 A | 2/1999 | Nakagawa et al. | |
| 6,315,816 B1 * | 11/2001 | Cho et al. | 95/96 |
| 6,387,845 B1 | 5/2002 | Masahiro et al. | |
| 6,712,879 B2 | 3/2004 | Kato et al. | |
| 2003/0232722 A1 * | 12/2003 | Kato et al. | 502/411 |

FOREIGN PATENT DOCUMENTS

| | | |
|---|---|---|
| JP | 9-99214 | 4/1997 |
| JP | 2000-262890 | 9/2000 |
| JP | 2001-170480 | 6/2001 |

OTHER PUBLICATIONS

U.S. Appl. No. 09/150,927, filed Sep. 10, 1998, Yoshihiro Akasaka, et al.

* cited by examiner

*Primary Examiner*—Edward M Johnson
(74) *Attorney, Agent, or Firm*—Oblon, Spivak, McClelland, Maier & Neustadt, L.L.P.

(57) ABSTRACT

A method of regenerating a carbon dioxide gas absorbent includes heating a carbon dioxide gas absorbent containing lithium silicate, which has been absorbed a carbon dioxide gas, under a reduced pressure atmosphere to release the carbon dioxide gas.

19 Claims, No Drawings

METHOD OF REGENERATING CARBON DIOXIDE GAS ABSORBENT

CROSS-REFERENCE TO RELATED APPLICATIONS

This application is based upon and claims the benefit of priority from prior Japanese Patent Application No. 2005-026826, filed Feb. 2, 2005, the entire contents of which are incorporated herein by reference.

BACKGROUND OF THE INVENTION

1. Field of the Invention

The present invention relates to a method of regenerating a carbon dioxide gas absorbent, in particular, a method of regenerating a carbon dioxide gas absorbent using lithium silicate as a carbon dioxide gas absorbent.

2. Description of the Related Art

In combustion apparatuses such as engines, which burn fuels mainly consisting of hydrocarbon, carbon dioxide gas is removed in the vicinity of a combustion chamber having a high carbon dioxide gas density, and thereby carbon dioxide gas in an exhaust gas can be efficiently removed. The vicinity of the combustion chamber having a high carbon dioxide gas density has a temperature of 300° C. or more, and thus it is required to absorb carbon dioxide gas under the temperature circumstances.

As well-known methods of separating carbon dioxide gas, there are a method using cellulose acetate, and a chemical absorption method using an alkanolamine solvent. However, in these separating methods, it is necessary to restrict a temperature of an introduction gas to about 200° C. or less. Therefore, to apply the separation methods to exhaust gases that requires removing at a high temperature, such as carbon dioxide gas exhausted from combustion apparatuses, it is necessary to cool the exhaust gas by a heat exchanger or a cooling tower, etc. This increases an energy consumption amount necessary for separating the carbon dioxide gas.

In such methods of separating carbon dioxide gas, Jpn. Pat. Appln. KOKAI Pub. No. 9-99214 discloses using a carbon dioxide gas absorbent containing lithium zirconate, and Jpn. Pat. Appln. KOKAI Pub. Nos. 2000-262890 and 2001-170480 disclose using a carbon dioxide gas absorbent containing lithium silicate. The carbon dioxide gas absorbents containing lithium zirconate or lithium silicate can absorb carbon dioxide gas at a temperature region exceeding 500° C. On the other hand, the absorbents release the carbon dioxide gas when the temperature reaches 750° C. or more. Further, the documents disclose that adding alkaline carbonate selected from lithium, sodium and potassium promotes absorption reaction of the carbon dioxide gas, and enables efficient absorption of carbon dioxide gas of a low concentration.

However, adding alkaline carbonate increases time required for releasing the absorbed carbon dioxide gas. Besides, in this case, the carbon dioxide gas is released at a higher temperature. Therefore, it is difficult for carbon dioxide gas absorbents containing alkaline carbonate to simultaneously satisfy properties required for absorption and release of carbon dioxide gas.

In comparison with this, Jpn. Pat. Appln. KOKAI Pub. No. 2001-299131 discloses that carbon dioxide gas absorbent containing alkaline carbonate with an amount of 0.5 to 4.9 mol % can release gas at a lower temperature. However, the temperature of releasing carbon dioxide gas is 750° C. or more due to thermodynamic equilibrium. This further densification of the carbon dioxide gas absorbent, and causes deterioration of the absorbent in the end.

BRIEF SUMMARY OF THE INVENTION

According to the present invention, there is provided a method of regenerating a carbon gas dioxide absorbent, comprising:

heating a carbon dioxide gas absorbent containing lithium silicate, which has been absorbed a carbon dioxide gas, under a reduced pressure atmosphere to release the carbon dioxide gas.

DETAILED DESCRIPTION OF THE INVENTION

A method of regenerating a carbon dioxide gas absorbent according to an embodiment of the present invention is described below.

A method of regenerating a carbon dioxide gas absorbent according to the embodiment comprises heating a carbon dioxide gas absorbent containing lithium silicate, which has absorbed a carbon dioxide gas, under a reduced pressure atmosphere to release the carbon dioxide gas.

The lithium silicate is represented by $Li_xSi_yO_z$ ($x+4y-2z=0$). For example, $Li_4SiO_4$ may be used as the lithium silicate.

The lithium silicate (for example, $Li_4SiO_4$) in a solid state reacts with carbon dioxide gas under a normal pressure in a temperature range of 100 to 700° C., and absorbs the carbon dioxide gas by producing lithium metasilicate and lithium carbonate that are in solid state, as shown in the following formula (1). When reaction with carbon dioxide further advances, the lithium metasilicate absorbs carbon dioxide gas by producing silicon dioxide and lithium carbonate as shown in the following formula (2).

Absorption: $Li_4SiO_4 + CO_2 \rightarrow Li_2SiO_3 + Li_2CO_3$     (1)

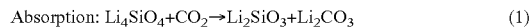

Absorption: $Li_2SiO_3 + CO_2 \rightarrow Li_2CO_3 + SiO_2$     (2)

Further, the above reactions are reversible. In the above formula (1), after the carbon dioxide gas is absorbed, the resultant substances are separated into lithium silicate and carbon dioxide gas according to reaction shown in the following formula (3) under a normal pressure and at a temperature of at least 800° C., and release carbon oxide gas. Further, in the above formula (2), after the carbon dioxide gas is absorbed, the resultant substances are separated into lithium metasilicate and carbon dioxide gas according to reaction shown in the following formula (4) under a normal pressure and at a temperature of at least 800° C., and release carbon oxide gas.

Release: $Li_2SiO_3 + Li_2CO_3 \rightarrow Li_4SiO_4 + CO_2$     (3)

Release: $Li_2CO_3 + SiO_2 \rightarrow Li_2SiO_3 + CO_2$     (4)

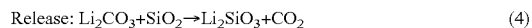

As described above, lithium silicate selectively absorbs carbon dioxide gas at a desired place such as a combustion chamber, releases the absorbed carbon dioxide gas to be regenerated, and can be reused as a carbon dioxide gas absorbent.

The carbon dioxide gas absorbent containing the above lithium silicate can be used, for example, as a form of a powder or a molded material formed of powder compressed such that carbon dioxide gas can pass through the inside thereof. Further, a porous material may be used as the carbon dioxide gas absorbent. The porous material preferably has a porosity of 30 to 60%.

If the carbon dioxide gas absorbent is a molded material, it preferably uses powder having an average particle size of 0.5 to 50 μm. The average particle size can be measured by laser diffraction, for example.

The carbon dioxide gas absorbent may have a composition in which at least one alkaline carbonate selected from the group consisting of lithium carbonate, sodium carbonate and potassium carbonate is added to lithium silicate. The alkaline carbonate is preferably contained with an amount of 0.5 to 10 mol % with respect to the total amount of the lithium silicate and the alkaline carbonate. If a porous material as the carbon dioxide gas absorbent is formed of such lithium silicate and alkaline carbonate, the added alkaline carbonate is held in pores of the porous body.

The carbon dioxide gas absorbent having the above porous structure is manufactured by the following method, for example. First, predetermined amounts of silicon dioxide and lithium carbonate are weighed, and mixed in a mortar or the like for 0.1 to 1 hour. The resultant mixed powder is put into an alumina crucible, and subjected to heat treatment in a box electric furnace or the like for 0.5 to 20 hours at a temperature of 600 to 1000° C. under atmospheric pressure, to synthesis lithium silicate powder. A predetermined amount of alkaline carbonate such as potassium carbonate is added to the lithium silicate powder, and subjected to dry mixing. Then, a predetermined amount of the mixture of the lithium silicate powder and the alkaline carbonate is weighted out, filled into a mold, and molded by compression to manufacture a carbon dioxide gas absorbent with a porous structure having a porosity of 30 to 60%.

The above heating is preferably performed under a reduced pressure atmosphere of not exceeding 0.9 atmospheres, more preferably not exceeding 0.7 atmospheres, further preferably not exceeding 0.6 atmospheres, most preferably not exceeding 0.5 atmospheres. Means for obtaining such a reduced pressure atmosphere can adopt an exhausting method using a blower, for example.

As described above, a carbon dioxide gas can release by heating the carbon dioxide gas absorbent containing lithium silicate, which has been absorbed a carbon dioxide gas, at low temperature of 600 to 750° C., under a reduced pressure atmosphere, for example. Specifically, it is possible to remarkably lower the release temperature of carbon dioxide gas. For example, the absorbent, which has absorbed a carbon dioxide gas, can release the carbon dioxide gas even at a temperature around 700° C., by heating the absorbent under a reduced pressure atmosphere of 0.7 atmospheres. Further, it is possible to increase the release speed of the carbon dioxide gas and lower the release temperature to 600° C. or around by heating the absorbent under a reduced pressure atmosphere of a lower pressure. It is considered that the release speed of the carbon gas is increased because a reduced pressure atmosphere of a lower pressure performs a function of removing a gas film on the surface of the carbon dioxide gas absorbent. An equilibrium temperature at which absorption apparently stops and release of carbon dioxide gas starts by the carbon dioxide gas absorbent depends on a partial pressure of carbon dioxide gas ($CO_2$). However, in the case of a carbon dioxide gas absorbent containing lithium silicate as in the embodiment, the equilibrium temperature greatly changes without depending on the partial pressure of carbon dioxide gas, by adopting a reduced pressure atmosphere, and thereby release reaction is promoted. This enables lowering of the release temperature.

According to the regenerating method of the embodiment, it is possible to release and regenerate carbon dioxide gas at low temperature of 600 to 750° C., for example, that is, with low energy, from the carbon dioxide gas absorbent which has been efficiently absorbed a carbon dioxide gas in a temperature range exceeding 500° C.

Examples of the present invention are explained below in detail.

<Manufacturing of Carbon Dioxide Gas Absorbent>

Lithium carbonate powder with an average particle size of 1 μm and silicon dioxide powder with an average particle size of 0.8 μm were weighed such that they have a molar ratio of 2:1, and they were subjected to dry mixing in a mortar for 10 minutes. The obtained mixed powder was subjected to heat treatment in a box electric furnace in an atmospheric pressure at 1000° C. for 8 hours, to synthesis lithium silicate ($Li_4SiO_4$) powder. Then, 3 mol % of potassium carbonate powder with an average particle size of 1 μm was added to the lithium silicate powder, and they were subjected to dry mixing in a mortar. The mixed powder was filled into a mold having a 12 mm diameter, and subjected to pressure forming. Thereby, a pellet porous material having a 3 mm thickness and a porosity of 40% was manufactured as the carbon dioxide gas absorbent.

EXAMPLE 1

A part of the obtained carbon dioxide gas absorbent was placed in a box electric furnace, and maintained at 500° C. Then, a mixture gas consisting of 20 vol % of carbon dioxide gas and 80 vol % of nitrogen gas was circulated through the electric furnace such that the carbon dioxide gas was absorbed by the carbon dioxide gas absorbent. The absorption of the carbon dioxide gas was performed until the weight of the carbon dioxide gas absorbent increases by 30 wt %.

On the other hand, a part of the obtained carbon dioxide gas absorbent was placed in a box electric furnace and maintained at 500° C., and thereafter subjected to a similar experiment by supplying only nitrogen gas. As a result, the weight of the carbon dioxide gas absorbent did not change at all, and it was verified that the absorbent selectively absorbs only carbon dioxide gas.

Next, the carbon dioxide gas absorbent, which has been absorbed carbon dioxide gas, was put back into the box electric furnace and maintained at 700° C. Then, the carbon dioxide gas absorbent was caused to release the carbon dioxide gas, by maintaining the box electric furnace at 0.9 atmospheres by evacuating the box electric furnace using a blower connected to an exhaust pipe of the box electric furnace while introducing carbon dioxide gas of 100% into the box electric furnace at 300 mL/minute.

After 30 minutes, the carbon dioxide gas absorbent returned to the weight thereof before absorption of carbon dioxide gas. Specifically, the carbon dioxide gas absorbent released all the absorbed carbon dioxide gas.

EXAMPLES 2 TO 4

Carbon dioxide gas absorbents, which has been absorbed carbon dioxide gas, in the same manner as in Example 1 were put in respective box electric furnaces. Then, the carbon dioxide gas absorbents were caused to release the carbon dioxide gas in the same manner as in Example 1, except that they were treated under reduced pressure atmospheres of 0.7 atmospheres (Example 2), 0.5 atmospheres (Example 3), and 0.3 atmospheres (Example 4), respectively.

As a result, in Example 2 with 0.7 atmospheres, after 20 minutes, the carbon dioxide gas absorbent returned to the weight thereof before absorption of carbon dioxide gas.

In Example 3 with 0.5 atmospheres, after 15 minutes, the carbon dioxide gas absorbent returned to the weight thereof before absorption of carbon dioxide gas.

In Example 4 with 0.3 atmospheres, after 12 minutes, the carbon dioxide gas absorbent returned to the weight thereof before absorption of carbon dioxide gas.

COMPARATIVE EXAMPLE 1

A carbon dioxide gas absorbent, which has been absorbed carbon dioxide gas, in the same manner as in Example 1 was put in a box electric furnace. Then, the carbon dioxide gas absorbent was caused to release the carbon dioxide gas in the same manner as in Example 1, except that it was treated under 1.0 atmosphere.

After 30 minutes, the carbon dioxide gas absorbent released carbon dioxide gas to a state with a weight of 15 wt % greater than the weight thereof before absorption of carbon dioxide gas. However, the weight of the carbon dioxide gas absorbent did not change thereafter.

Therefore, the carbon dioxide gas was released from the carbon dioxide gas absorbent under a reduced pressure atmosphere as in Examples 1 to 4, and thus it was verified that it is possible to completely release carbon dioxide gas even in a temperature range (for example, 600 to 750° C.) where carbon dioxide gas was not completely released with a conventional method as in Comparative Example 1.

Additional advantages and modifications will readily occur to those skilled in the art. Therefore, the invention in its broader aspects is not limited to the specific details and representative embodiments shown and described herein. Accordingly, various modification may be made without departing from the spirit or scope of the general inventive concept as defined by the appended claims and their equivalents.

What is claimed is:

1. A method of regenerating a used carbon dioxide gas absorbent, comprising:
    heating under a reduced pressure atmosphere a used carbon dioxide gas absorbent comprising lithium silicate which has absorbed carbon dioxide to release the absorbed carbon dioxide from the used carbon dioxide gas absorbent, thereby producing a regenerated carbon dioxide gas absorbent comprising lithium silicate.

2. A method according to claim 1, wherein the heating is performed under a reduced pressure of 0.9 atmospheres or less.

3. A method according to claim 1, wherein the heating is performed under a reduced pressure of 0.7 atmospheres or less.

4. A method according to claim 1, wherein the heating is performed under a reduced pressure of 0.6 atmospheres or less.

5. A method according to claim 1, wherein the heating is performed at a temperature of 600 to 750° C.

6. A method according to claim 1, wherein the used carbon dioxide gas absorbent further comprises at least one alkaline carbonate selected from the group consisting of lithium carbonate, sodium carbonate and potassium carbonate.

7. A method according to claim 6, wherein a content of the alkaline carbonate is 0.5 to 10 mol % based on the total amount of the lithium silicate and the alkaline carbonate.

8. A method according to claim 1, wherein the lithium silicate is $Li_4SiO_4$.

9. A method according to claim 1, wherein the lithium silicate is $Li_2SiO_3$.

10. A method according to claim 1, wherein the carbon dioxide gas absorbent is in the form of a powder.

11. A method according to claim 1, wherein the carbon dioxide gas absorbent is in the form of a molded material formed of compressed powder.

12. A method according to claim 11, wherein the powder has an average particle size of 0.5 to 50 μm.

13. A method according to claim 2, wherein the heating is performed at a temperature of 600 to 750° C.

14. A method according to claim 3, wherein the heating is performed at a temperature of 600 to 750° C.

15. A method according to claim 4, wherein the heating is performed at a temperature of 600 to 750° C.

16. A method according to claim 6, wherein the heating is performed at a temperature of 600 to 750° C. under a reduced pressure of 0.9 atmospheres or less.

17. A method according to claim 7, wherein the heating is performed at a temperature of 600 to 750° C. under a reduced pressure of 0.9 atmospheres or less.

18. A method according to claim 8, wherein the heating is performed at a temperature of 600 to 750° C. under a reduced pressure of 0.9 atmospheres or less.

19. A method according to claim 9, wherein the heating is performed at a temperature of 600 to 750° C. under a reduced pressure of 0.9 atmospheres or less.

* * * * *